United States Patent [19]

Curley

[11] Patent Number: 4,492,594

[45] Date of Patent: Jan. 8, 1985

[54] METHOD AND APPARATUS FOR LIQUEFYING MATERIAL WITH RETAINER MEANS

[75] Inventor: John E. Curley, Pittsburgh, Pa.

[73] Assignee: PPG Industries, Inc., Pittsburgh, Pa.

[21] Appl. No.: 567,603

[22] Filed: Jan. 3, 1984

[51] Int. Cl.³ .................................................. C03B 5/10
[52] U.S. Cl. ........................................ 65/134; 65/135; 65/136; 65/335; 65/337
[58] Field of Search ................ 65/134, 135, 136, 335, 65/337

[56] References Cited

U.S. PATENT DOCUMENTS

| 2,006,947 | 7/1935 | Ferguson | 65/134 |
| 2,007,755 | 7/1935 | Ferguson | 65/134 |
| 2,262,069 | 11/1941 | Turk | 65/135 X |
| 2,834,157 | 5/1958 | Bowes | 65/335 X |
| 4,372,771 | 2/1983 | Coucoulas et al | 65/134 X |
| 4,381,934 | 5/1983 | Kunkle et al | |

Primary Examiner—Arthur Kellogg
Attorney, Agent, or Firm—Dennis G. Millman

[57] ABSTRACT

In an arrangement for liquefying pulverulent materials such as glass batch, the material to be liquefied is deposited onto a sloped surface comprised of a compatible pulverulent material retained in place by a grid-like member.

15 Claims, 1 Drawing Figure

METHOD AND APPARATUS FOR LIQUEFYING MATERIAL WITH RETAINER MEANS

BACKGROUND OF THE INVENTION

The present invention relates to converting pulverulent raw materials to a liquefied state as a first step in a melting process. The invention is generally applicable to processes that involve thermally converting a generally flowable, essentially solid state feed material to a molten fluid. The invention is particularly useful for liquefying glassy materials, including flat glass, container glass, fiber glass, sodium silicate glass, frits, cullet and the like, but is also applicable to liquefying ceramic materials, ores and other mineral materials.

U.S. Pat. No. 4,381,934 to Kunkle et al. teaches a method of converting particulate raw materials to a partially melted liquefied state on a support surface of batch material within a melting chamber. The initial process of liquefying batch material is isolated from the remainder of the melting process and is carried out in a manner uniquely suited to the needs of that particular step, thereby permitting the liquefaction step to be carried out with considerable economies in energy consumption and equipment size and costs. In the preferred embodiments of the Kunkle invention, thermal energy is supplied to a central cavity encircled by a layer of the raw material. Liquefied material is drained at the bottom end of the cavity and additional raw material is fed onto a top portion of the layer. The liquefaction takes place primarily in a surface transient layer while an underlying layer of the raw material remains substantially stable and unmelted. The material of the stable layer is chosen to be compatible with the throughput material, and therefore the stable layer acts as a non-contaminating, thermally insulating layer for the liquefying process. A steady state condition may be maintained in the liquefaction chamber by depositing fresh raw material onto the stable layer at essentially the same rate at which the material is melting, whereby a substantially constant thickness of the batch layer may be maintained to thermally protect the external structure of the melter. Because the partially melted material is in contact essentially only with material equivalent in composition, contaminating contact with refractories is substantially avoided.

While the protective lining of the stable layer of unmelted material remains essentially constant, there are minor fluctuations in the location of the interface between the stable layer and the transient layer. Irregularities in the interface generally correct themselves within a relatively short period of time with little or no disruption to the liquefaction process. However, occasionally a mass of the lining material may become dislodged and pass through the outlet before becoming entirely liquefied. It would be desirable to suppress these periodic deviations from steady-state operation.

In the Kunkle et al. type of liquefaction process, a steep slope on the lining relative to the axis of symmetry of the heated central cavity is advantageous in that it permits the surface of the unlined lid member to be maintained small relative to the lined surface area surrounding the cavity. In some embodiments, the slope of the lining can be increased by rotating the lining about the central cavity. In non-rotating embodiments, means for providing increased slope would be desirable. In rotating embodiments, such means would also be desirable to make the slope less dependent on the speed of rotation.

The Kunkle et al. process is not intended to complete the melting process, but rather to carry out only the initial liquefaction step. Completing the melting of undissolved particles and expulsion of gaseous inclusions from the liquefied material may be carried out in a separate stage downstream from the liquefaction chamber. For these subsequent steps it is often desirable to increase the temperature of the molten material above its liquefaction temperature. To assist in at least initiating such a temperature increase, it would be desirable in some cases to increase the residence time of the liquefied material within the liquefaction chamber so as to increase the temperature at which it leaves the liquefaction chamber.

SUMMARY OF THE INVENTION

In the present invention an ablation liquefaction arrangement of the type taught in U.S. Pat. No. 4,381,934 of Kunkle et al. is provided with a foraminous grid-like member approximately at the interface between the stable layer of unmelted material lining the liquefaction vessel and the transient layer being liquefied. The grid-like member closely conforms to the contour desired for the stable layer and serves to reinforce its contour. The grid member thus aids in retaining the stable layer in place, preventing sudden erosion of unusually large portions of the unmelted material from the lining and permitting the lining to be more steeply sloped than would otherwise be practical. Additionally, the grid member may be designed so as to retard the flow of liquefied material out of the liquefaction chamber, thereby increasing its residence time and causing its temperature to be higher upon exit.

The foraminous grid-like member of the present invention may be in the form of a mesh, screen basket, or other array of baffle-like members. The grid may be fabricated from metallic threads or rods interwoven, welded, or otherwise fastened together so as to establish an essentially fixed structural interrelationship. Alternatively, the grid could be stamped from a continuous sheet of material.

If the primary purpose for the grid is to retain the lining in place or to increase the slope thereof, the elements of the grid should be spaced sufficiently close to effect that purpose while leaving a major portion of the lining surface exposed to the liquefying process. If a primary objective is to increase residence time, the grid should be provided with elements that extend transversely to the direction of flow of liquefied material in the cavity.

The grid may be made of refractory material such as platinum or an alloy of platinum such as a platinum-rhodium alloy. In order to increase the longevity of a platinum, it would be desirable to maintain the grid covered with the fluid transient layer of liquefied material in the cavity.

DETAILED DESCRIPTION OF THE INVENTION

Figure 1:
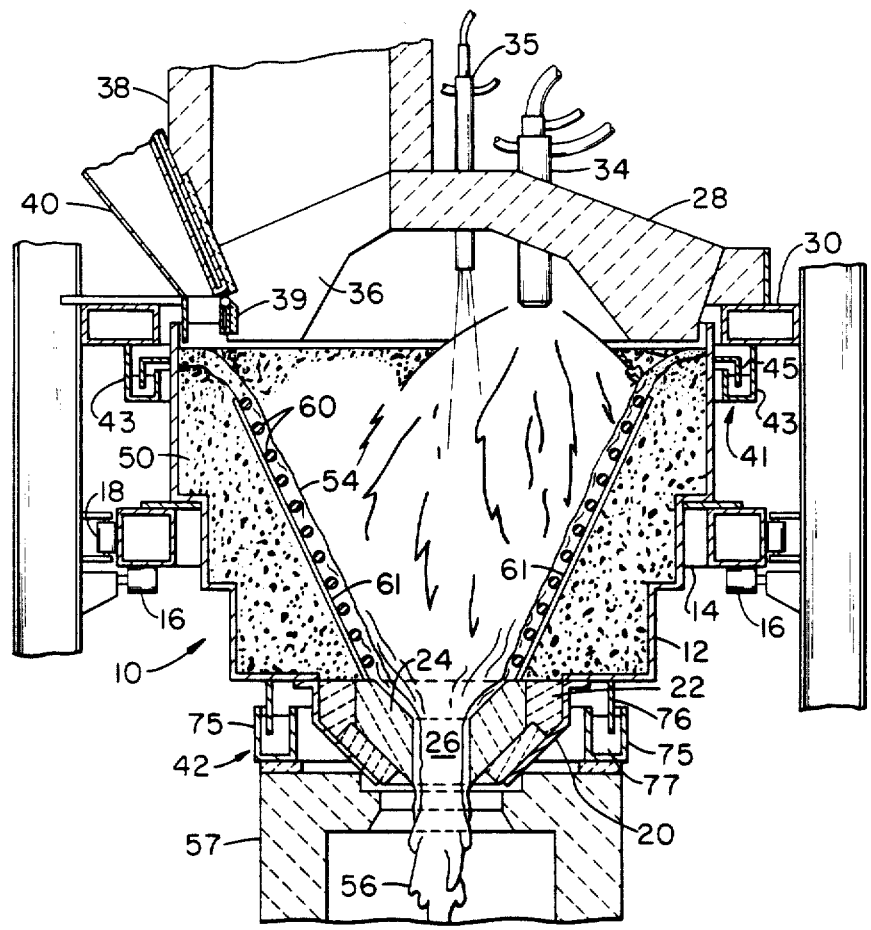
FIG. 1 discloses a cross-section view of an arrangement for liquefying pulverulent material which is continuously deposited on a sloping surface of a melting furnace with the inventive grid-like member spaced over the said surface to control movement of the pulverulent material during melting.

The preferred embodiment of the present invention relates to an ablation liquefaction process such as that taught in U.S. Pat. No. 4,381,934 and U.S. patent application Ser. No. 481,970 filed Apr. 4, 1983, both of Kunkle et al., the teachings of which are hereby incorporated by reference.

For purposes of illustration, the invention will be described as practiced for liquefying glass batch material, but it should be understood that the invention is applicable to the liquefaction of similar materials as well, and may include metallurgical smelting type operations and fusing of single or multiple component ceramics, metals, or other materials.

With reference to FIG. 1, the melter may include a steel drum 12 having stepped sidewalls so as to decrease the amount of mass being rotated. The drum 12 is supported on a circular frame 14 which is, in turn, mounted for rotation about a generally vertical axis corresponding to the center-line or axis of symmetry of the drum on a plurality of support rollers 16 and aligning rollers 18. A bottom section 20 may be detachably secured to the drum 12. The bottom section 20 may be lined with an annulus of refractory material 22 such as castable refractory cement in which is seated a ring-like bushing 24 of an erosion resistant refractory material. The bushing 24 may be comprised of a plurality of cut pieces of ceramic. An open center 26 in the bushing 24 comprises the outlet opening from the liquefaction chamber. An upwardly domed refractory lid 28 is provided with stationary support by way of a surrounding frame member 30. The lid includes openings for inserting a primary burner 34 and optionally an auxiliary burner 35. The arrangement lends itself to the use of oxygen-enriched combustion. Alternatively, the heat source may be an electric arc or plasma torch. Exhaust gases escape upwardly through an opening 36 through the lid 28 and into an exhaust duct 38. The opening 36 may also be utilized for feeding the raw materials to the liquefaction chamber and as shown in FIG. 1, a feed chute 40 is provided for this purpose.

To isolate the interior of the liquefaction chamber from the exterior ambient conditions and to trap any dust or vapors that may escape from the vessel, upper and lower water seals 41 and 42, respectively, may be provided. The upper seal comprises a trough 43 affixed to the frame 30 and a flange 45 attached to the drum 12 and having a downwardly extending portion immersed in a liquid (e.g., water) contained in the trough 43. The lower seal similarly includes a trough 75 and a flange 76 immersed in liquid 77.

As shown, a stable layer of batch material 50 lines the interior of the drum 12. Before the melter 10 is heated, the stable layer of batch materials 50 is provided in the melter by feeding loose batch through the feed chute 40 while the housing is rotated. The loose batch assumes a generally parabolic contour as shown in FIG. 1. The batch material may be wetted, e.g., with water, during the initial stage of forming the stable layer to facilitate cohesion of the layer along the side walls.

During the melting process, continuous feeding of batch to the melter 10 results in a falling stream of batch that becomes distributed over the surface of the stable batch layer 50, and by the action of the heat from the burner or burners, becomes liquefied in a transient layer 54 that runs to the bottom of the vessel and passes through the open center 26. The liquefied material 56 falls from the exit opening and may be collected in a downstream vessel 57 for further processing. With this arrangement, high thermal efficiency is provided by encircling the heat source with the batch material being melted and the transient layer 54 being melted is distributed within the vessel by means of its rotation. Thus, the material initially remains exposed to the heat until it becomes liquefied, whereupon it flows out of the liquefaction zone.

An optional feature of the embodiment depicted is a pivotable deflector 39 at the lower end of the feed chute 40. The deflector 39 serves to direct the incoming batch stream onto the desired portion of the stable batch layer 50.

In FIG. 1 there is shown a preferred embodiment of the grid-like member of the present invention. In this embodiment the grid is comprised of a cage-like structure having an overall frusto-conical shape and formed from a plurality of circular members 60 welded or otherwise affixed to elongate spacer members 61. The elements 60 and 61 may be of platinum wire or rod of sufficient thickness to be substantially rigid under the conditions encountered within the liquefaction chamber. The size of the spaces between the elements 60 and 61 is a tradeoff between the degree of batch retention desired and the amount of material that is to be incorporated into the grid, which is particularly significant in the case of a costly precious metal such as platinum. In the case of glass batch liquefaction, an approximate useful range for the area of the openings may encompass 1 square centimeter to 100 square centimeters. When it is desired to enhance the ability of the grid to retard the flow of liquid, the horizontally extending members 60 could be in the form of flattened ribbons or plates extending transversely from the spacer members 61. Other configurations for the grid member will be obvious to those of skill in the art.

In those cases where the object is to increase the slope of the stable layer, the grid member is provided with a slope that is steeper than the natural angle of repose of the material comprising the layer. In rotating embodiments the stable layer will assume a slope greater than the natural angle of response due to centrifugal force, and the grid may serve to increase the slope further or to permit slower rotation of the vessel while maintaining a given slope.

The invention is not limited to the example of melting glass batch materials. Combinations of properties analogous to those in the liquefaction of glass batch may be found in the fusing of ceramic materials and the like and in metallurgical smelting-type operations. Whatever the material to be liquefied, the invention may advantageously be practiced for control of a liquefaction process carried out with a transient layer of batch material supported by a stable layer of granular, preferably non-contaminating material. The preferred stable granular layer provides thermal insulation as well as a non-contaminating contact surface for the transient batch layer, and most preferably the stable layer includes one or more constituents of the batch material. It is desirable for the thermal conductivity of the material employed as a stable layer to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a non-contaminating stable layer. For example, in a glass-making process pulverized cullet (scrap glass) could constitute the stable layer, although a thicker layer may be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

The preferred embodiment described above entails rotating the lining about the central cavity, but it should be understood that the present invention is applicable to embodiments in which the lining encircles the heated cavity but is not rotated. Additionally, the invention is applicable to embodiments in which the lining is a sloped surface, but does not encircle the heat source (e.g., melting takes place on a ramp). Examples of such variations are described in the aforesaid Kunkle et al. patent and application.

The details described above have been presented to illustrate the best mode of the invention and are not limiting to the invention, the scope of which is defined by the claims which follow.

I claim:

1. Apparatus for liquefying pulverulent material comprising: a vessel having an interior side wall, means for heating the interior of the vessel to a liquefying temperature, outlet means at a bottom portion of the vessel for draining liquefied material from the vessel, inlet means at an upper portion of the vessel for feeding pulverulent material onto interior side wall portions of the vessel, and grid means within the vessel spaced from the interior side wall for retaining pulverulent material against the interior side wall portions.

2. The apparatus of claim 1 wherein the side wall encircles a central cavity and the grid member is generally frusto-conical in shape.

3. The apparatus of claim 2 wherein the vessel is mounted for rotation about a substantially vertical axis.

4. The apparatus of claim 3 wherein the grid means comprises a plurality of elongated elements in fixed relationship to one another.

5. The apparatus of claim 4 wherein the grid member is fabricated from refractory metal.

6. The apparatus of claim 4 wherein the grid is comprised of horizontally elongated elements mounted in the path of flow of the liquefied material so as to retard the flow.

7. The apparatus of claim 4 wherein the grid elements have spaces therebetween of about 1 to 100 square centimeters.

8. The apparatus of claim 3 wherein the vessel comprises a metallic drum.

9. The apparatus of claim 1 wherein the grid means slopes at an angle greater than the natural angle of repose of the pulverulent material.

10. A method for liquefying pulverulent material comprising: providing a lining of pulverulent material on interior side wall portions of a vessel so as to present a sloped melting surface, feeding additional pulverulent material onto the lining, heating the vessel interior so as to liquefy portions of the pulverulent material, draining the liquefied material from the vessel, and retaining the lining in place by means of a grid structure in contact therewith.

11. The method of claim 10 wherein the lining is provided so as to encircle a central cavity within the vessel, and the heating is provided to the central cavity.

12. The method of claim 11 wherein the lining is rotated about the central cavity.

13. The method of claim 10 wherein the pulverulent material being liquefied is glass batch material.

14. The method of claim 1 wherein the lining material is retained by the grid at a slope greater than the natural angle of response of the material.

15. The method of claim 10 wherein the grid is maintained covered by the liquefied material.

* * * * *